(12) United States Patent
Xiao et al.

(10) Patent No.: US 9,923,469 B2
(45) Date of Patent: Mar. 20, 2018

(54) MOTOR DRIVE FILTER DAMPING

(71) Applicant: Rockwell Automation Technologies, Inc., Mayfield Heights, OH (US)

(72) Inventors: Yuan Xiao, Kitchener (CA); Zhongyuan Cheng, Cambridge (CA); Lixiang Wei, Mequon, WI (US); Navid R. Zargari, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 5 days.

(21) Appl. No.: 15/149,384

(22) Filed: May 9, 2016

(65) Prior Publication Data

US 2017/0324333 A1 Nov. 9, 2017

(51) Int. Cl.
*H02M 1/14* (2006.01)
*H02M 3/24* (2006.01)
*H02M 1/36* (2007.01)

(52) U.S. Cl.
CPC .............. *H02M 3/24* (2013.01); *H02M 1/36* (2013.01)

(58) Field of Classification Search
CPC ............. H02M 1/34; H02M 2001/342; H02M 2001/344; H02M 1/12; H02M 2001/123; H02M 2007/4811; H02M 1/36
USPC ............ 363/49, 56.12, 47, 48; 318/611, 702
See application file for complete search history.

(56) References Cited

U.S. PATENT DOCUMENTS

| 4,937,719 A | 6/1990 | Yamada et al. |
| 5,343,381 A | 8/1994 | Bolduc et al. |
| 6,166,929 A | 12/2000 | Ma et al. |
| 6,269,010 B1 | 7/2001 | Ma et al. |
| 6,842,351 B2 * | 1/2005 | Gauthier ............ H02J 1/02 363/39 |
| 6,934,167 B2 | 8/2005 | Jang et al. |
| 7,016,205 B2 * | 3/2006 | Steigerwald ............ H02M 1/12 363/40 |
| 7,190,143 B2 | 3/2007 | Wei et al. |
| 7,274,576 B1 | 9/2007 | Zargari et al. |
| 7,502,238 B2 | 3/2009 | Wei et al. |
| 7,602,622 B2 | 10/2009 | Wei et al. |

(Continued)

FOREIGN PATENT DOCUMENTS

| CN | 204441884 U | 7/2015 |
| DE | 2704112 A1 | 7/1978 |

(Continued)

OTHER PUBLICATIONS

Ahmed, et al., "Passive Filter Design for Three-Phase Inverter Interfacing in Distributed Generation", IEEE Xplore, downloaded on Apr. 18, 2010 at 13:45:10 UTC from IEEE Xplore, 9 pgs.

(Continued)

*Primary Examiner* — Alex Torres-Rivera
(74) *Attorney, Agent, or Firm* — Fay Sharpe LLP

(57) ABSTRACT

Disclosed examples include methods, power converters and damping circuits to control damping of an input filter circuit, in which a low-voltage secondary winding is wound around a common core with a primary winding connected between an AC input and a rectifier input of the converter, where the secondary winding is coupled in a series circuit with a damping resistor and a switch, and a controller selectively closes the switch with a controlled on-time at system power up and/or in response to detection of oscillation or transients in the power converter.

19 Claims, 10 Drawing Sheets

(56) References Cited

U.S. PATENT DOCUMENTS

| | | |
|---|---|---|
| 7,606,052 B2 | 10/2009 | Akagi |
| 7,728,544 B2 | 6/2010 | Qian et al. |
| 7,990,097 B2 | 8/2011 | Cheng et al. |
| 8,669,743 B2 * | 3/2014 | Rozman .................... H02J 1/02 323/222 |
| 8,816,631 B2 | 8/2014 | Wei et al. |
| 2003/0205990 A1 * | 11/2003 | Wittenbreder, Jr. .... H02M 1/34 323/222 |
| 2006/0244428 A1 * | 11/2006 | Jitaru ...................... H02M 1/34 323/222 |
| 2007/0127276 A1 * | 6/2007 | Yoshimatsu ............ H02M 1/36 363/49 |
| 2008/0278109 A1 * | 11/2008 | Qian ...................... H02M 1/126 318/803 |
| 2012/0007425 A1 * | 1/2012 | Rozman ................. H02J 1/102 307/25 |
| 2013/0049885 A1 * | 2/2013 | Rozman ................. H02M 1/15 333/181 |
| 2013/0076285 A1 | 3/2013 | Choi et al. |
| 2013/0241451 A1 | 9/2013 | Wei et al. |
| 2013/0286692 A1 | 10/2013 | Patel et al. |
| 2013/0289911 A1 | 10/2013 | Patel et al. |
| 2014/0210441 A1 * | 7/2014 | Mao ....................... H02M 3/156 323/282 |
| 2014/0268953 A1 | 9/2014 | Patel et al. |
| 2014/0268954 A1 | 9/2014 | Wei et al. |
| 2014/0300288 A1 * | 10/2014 | Chen ................. H05B 33/0803 315/200 R |
| 2016/0352318 A1 * | 12/2016 | Amit ................. H03K 17/0814 |

FOREIGN PATENT DOCUMENTS

| | | |
|---|---|---|
| EP | 0975084 A2 | 1/2000 |
| EP | 2200165 A1 | 6/2010 |
| EP | 2660961 A2 | 11/2013 |
| JP | H07322484 A | 12/1995 |
| WO | WO 2012/097529 A1 | 7/2012 |

OTHER PUBLICATIONS

European Search Report of European Application No. 17168370.9-1809 dated Aug. 17, 2017, 6 pages.

* cited by examiner

US 9,923,469 B2

MOTOR DRIVE FILTER DAMPING

BACKGROUND INFORMATION

The subject matter disclosed herein relates to power conversion and more specifically to power converters with input filters.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems, damping circuits and methods to selectively damp oscillations and/or transients of an input filter using a secondary winding magnetically coupled with a filter inductor winding in a series circuit with a damping resistor and a switch.

THE BRIEF DESCRIPTION OF THE DRAWINGS

Figure 1:
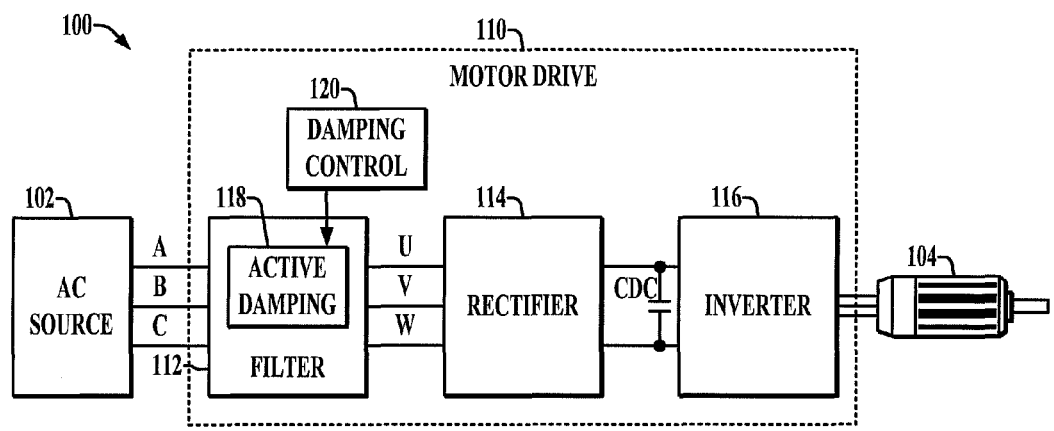
Figure 2:
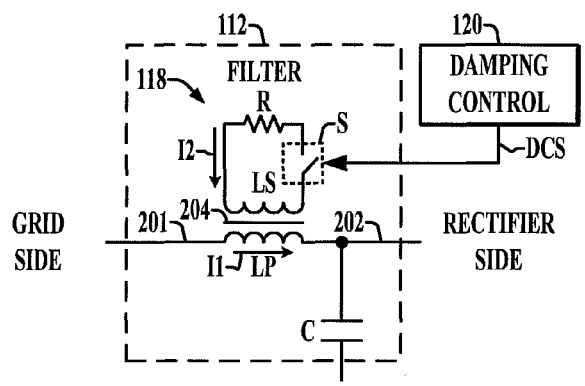
Figure 3:
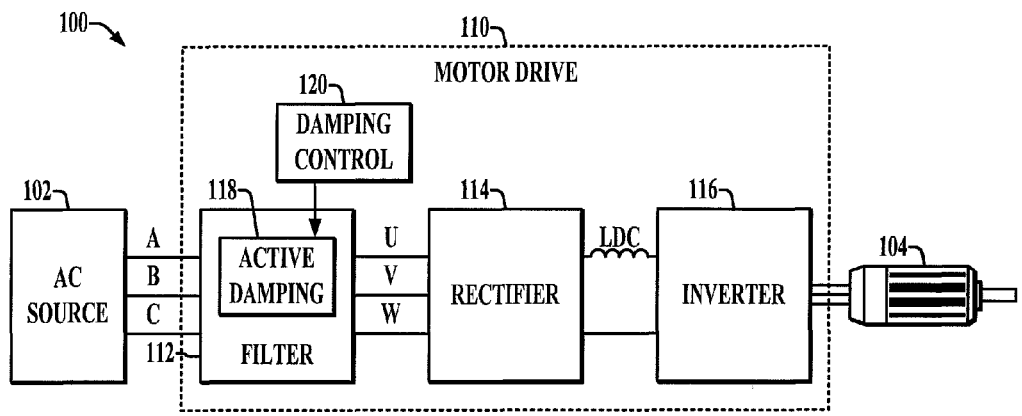
Figure 4:
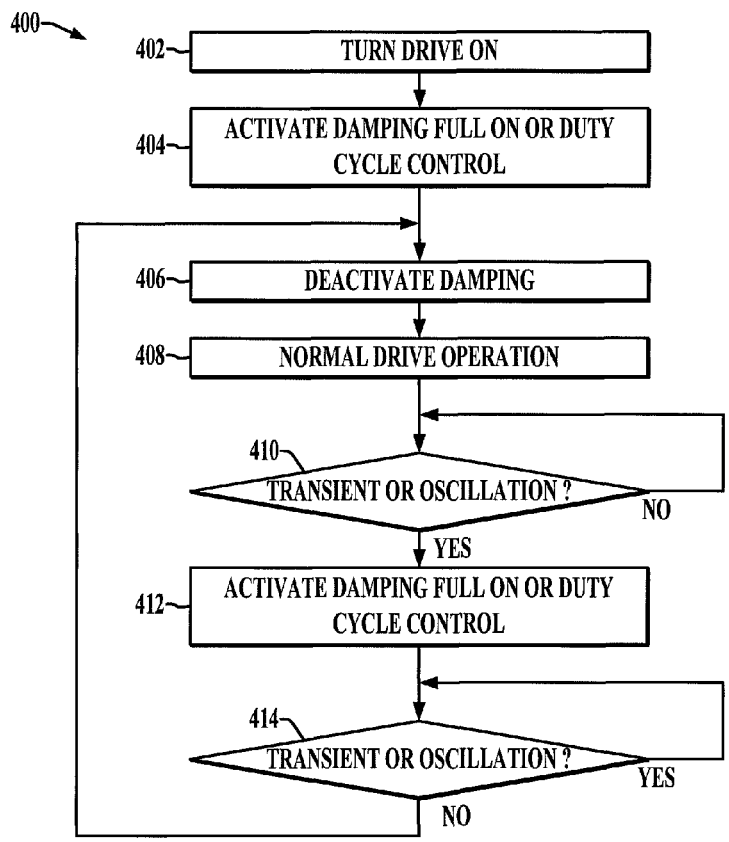
Figure 5:
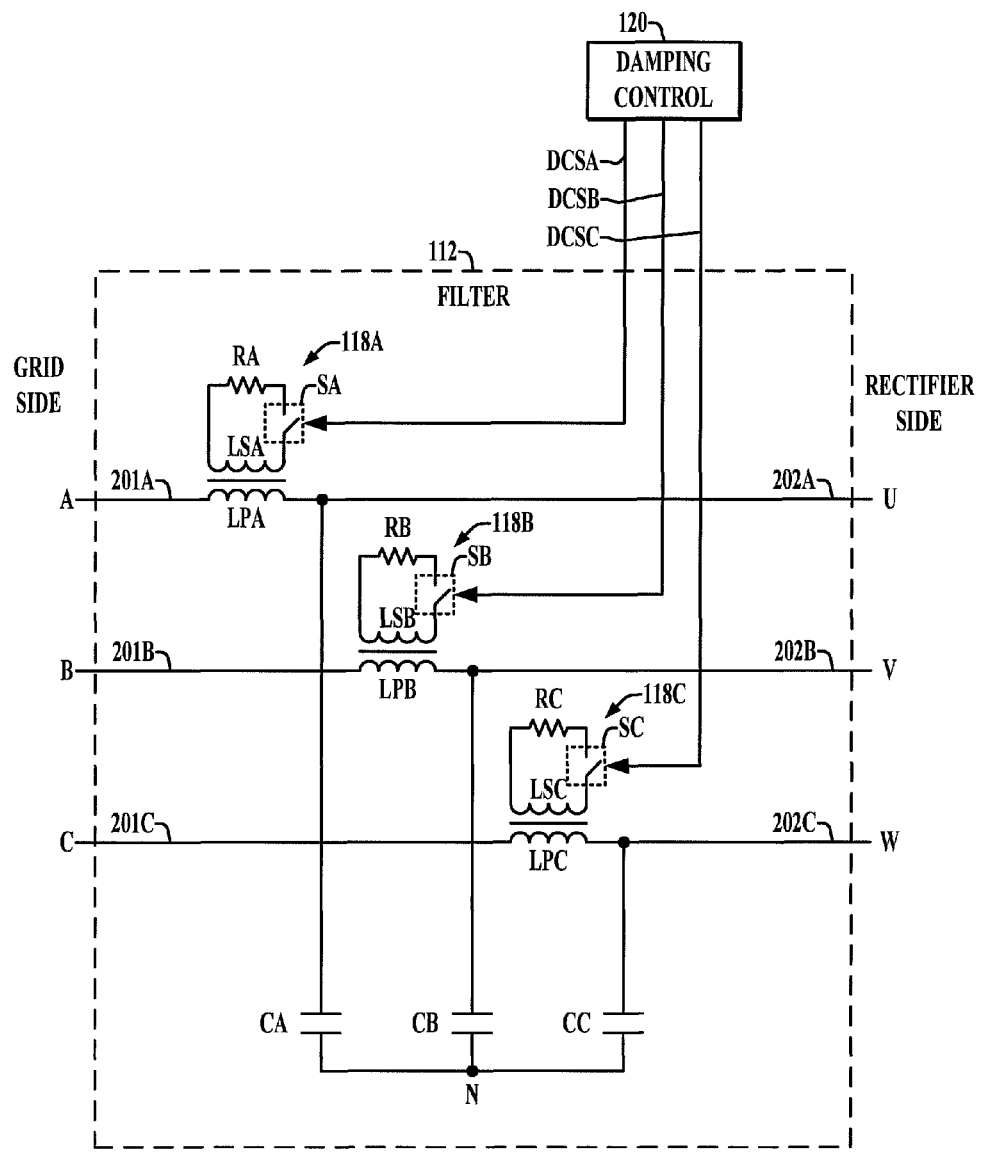
Figure 6:
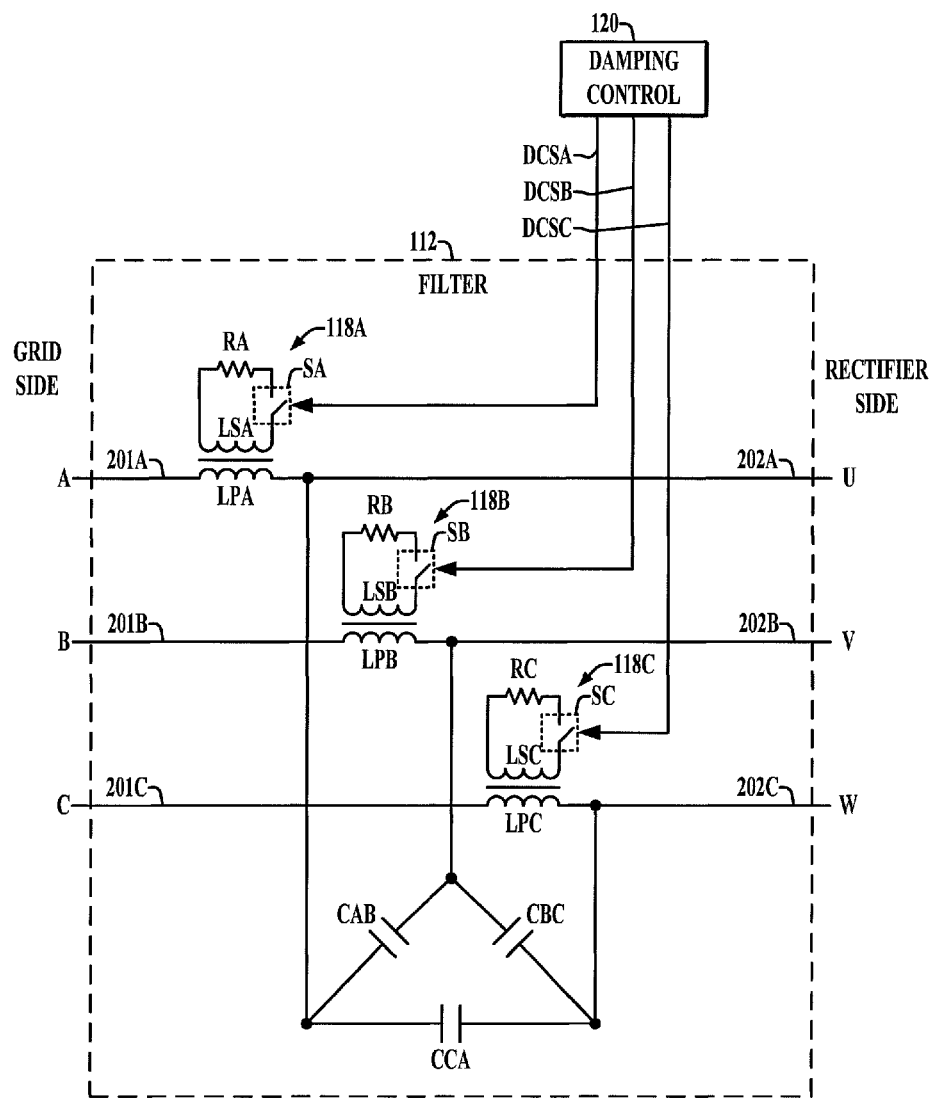
Figure 7:
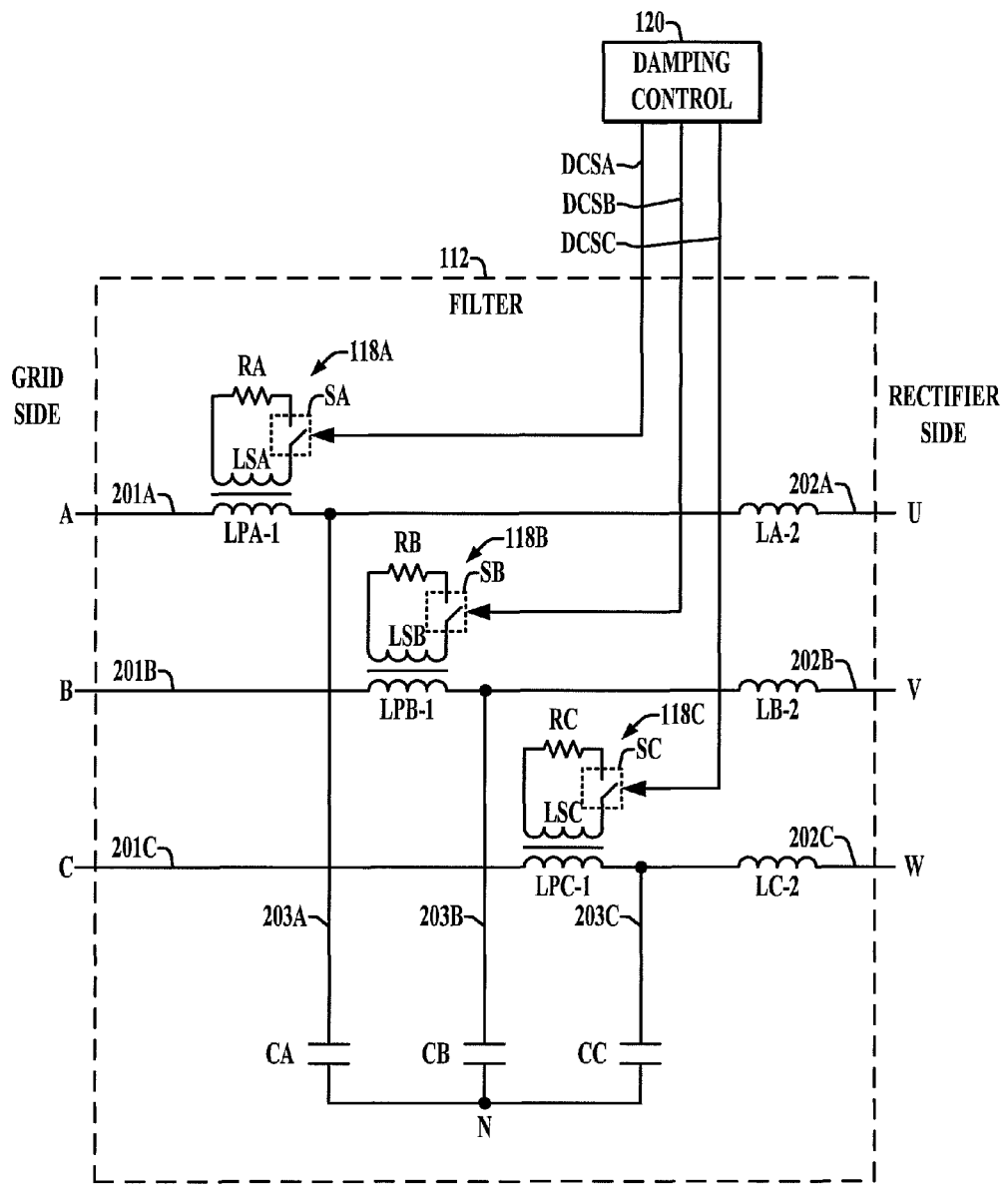
Figure 8:
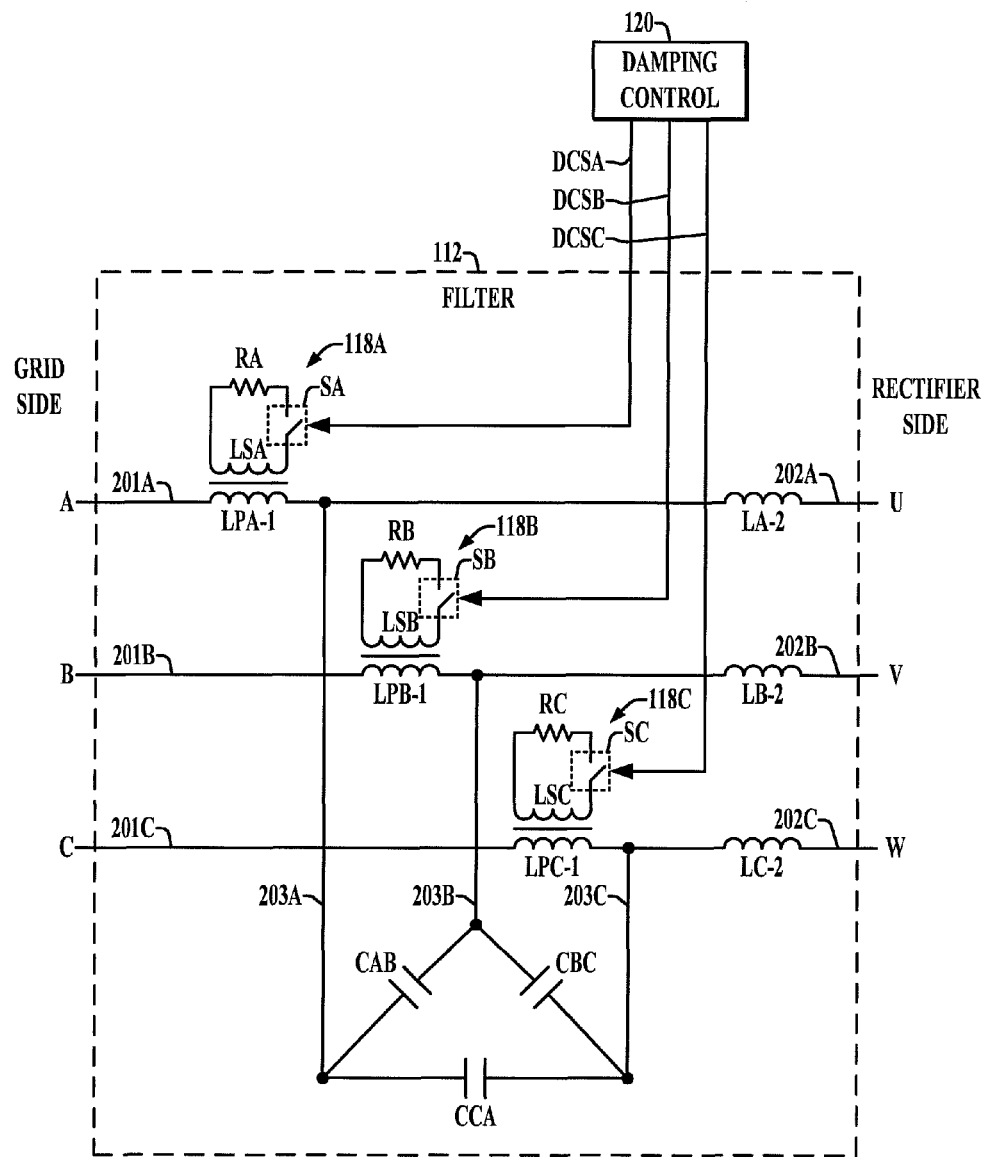
Figure 9:
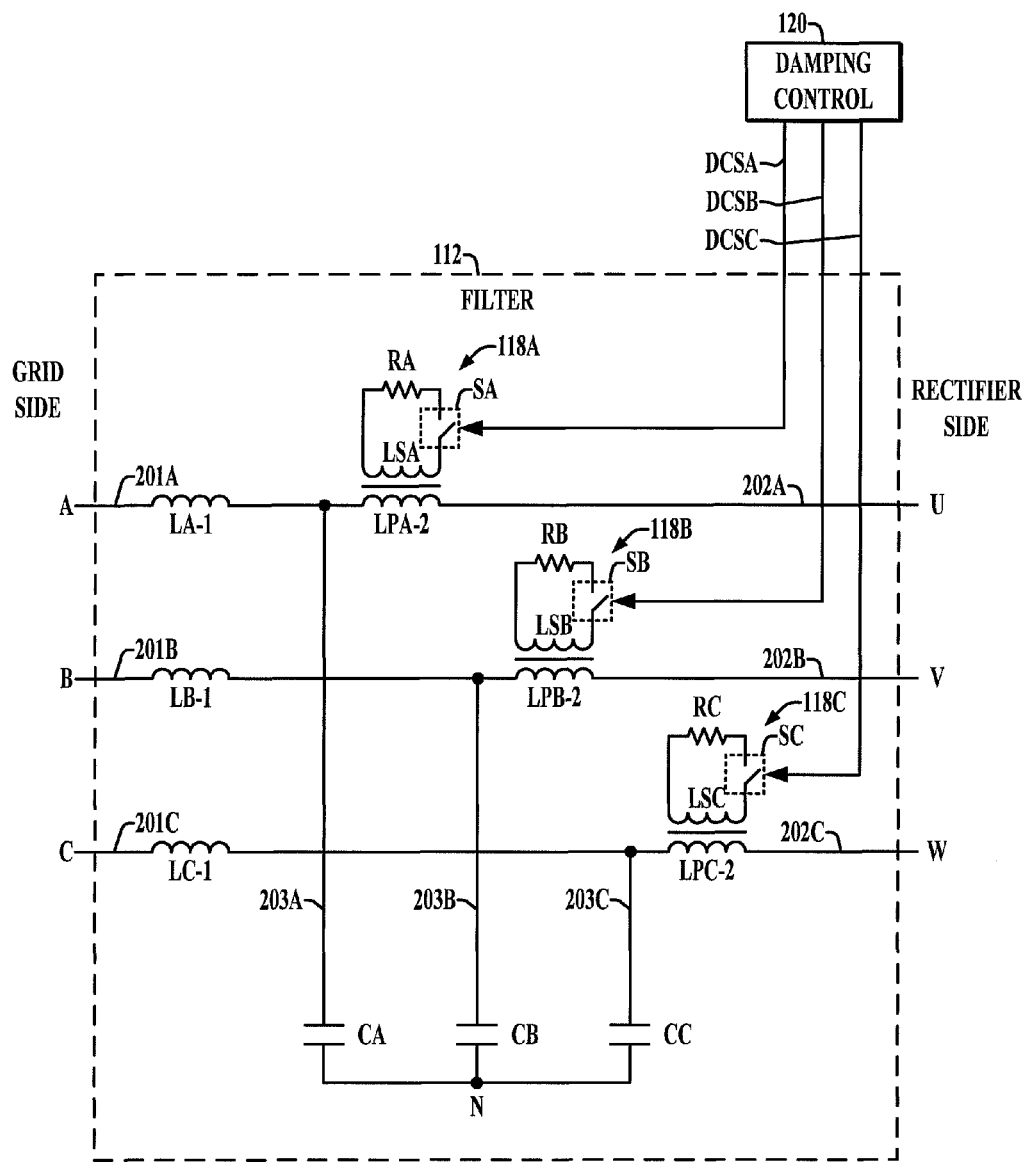
Figure 10:
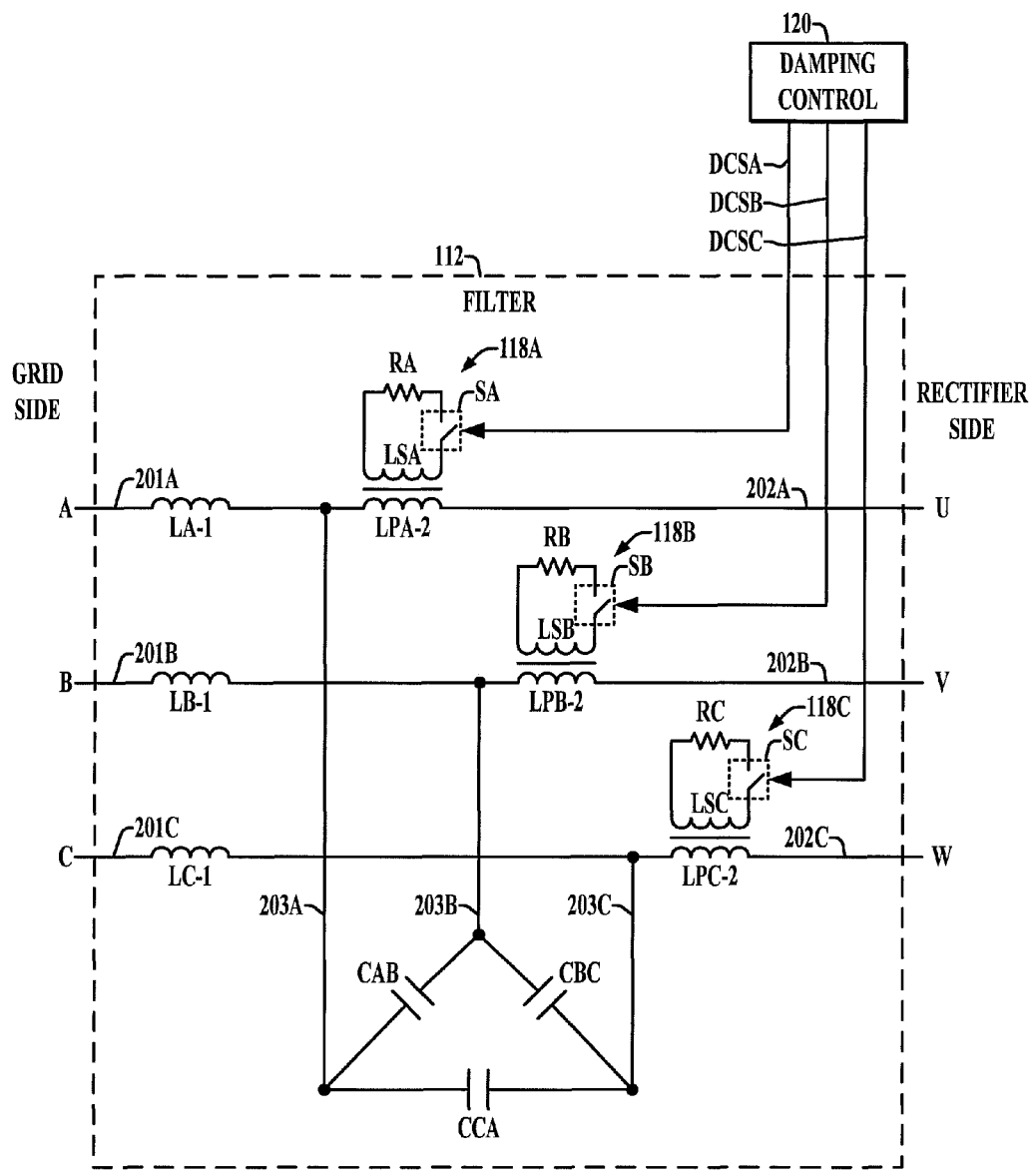
Figure 11:
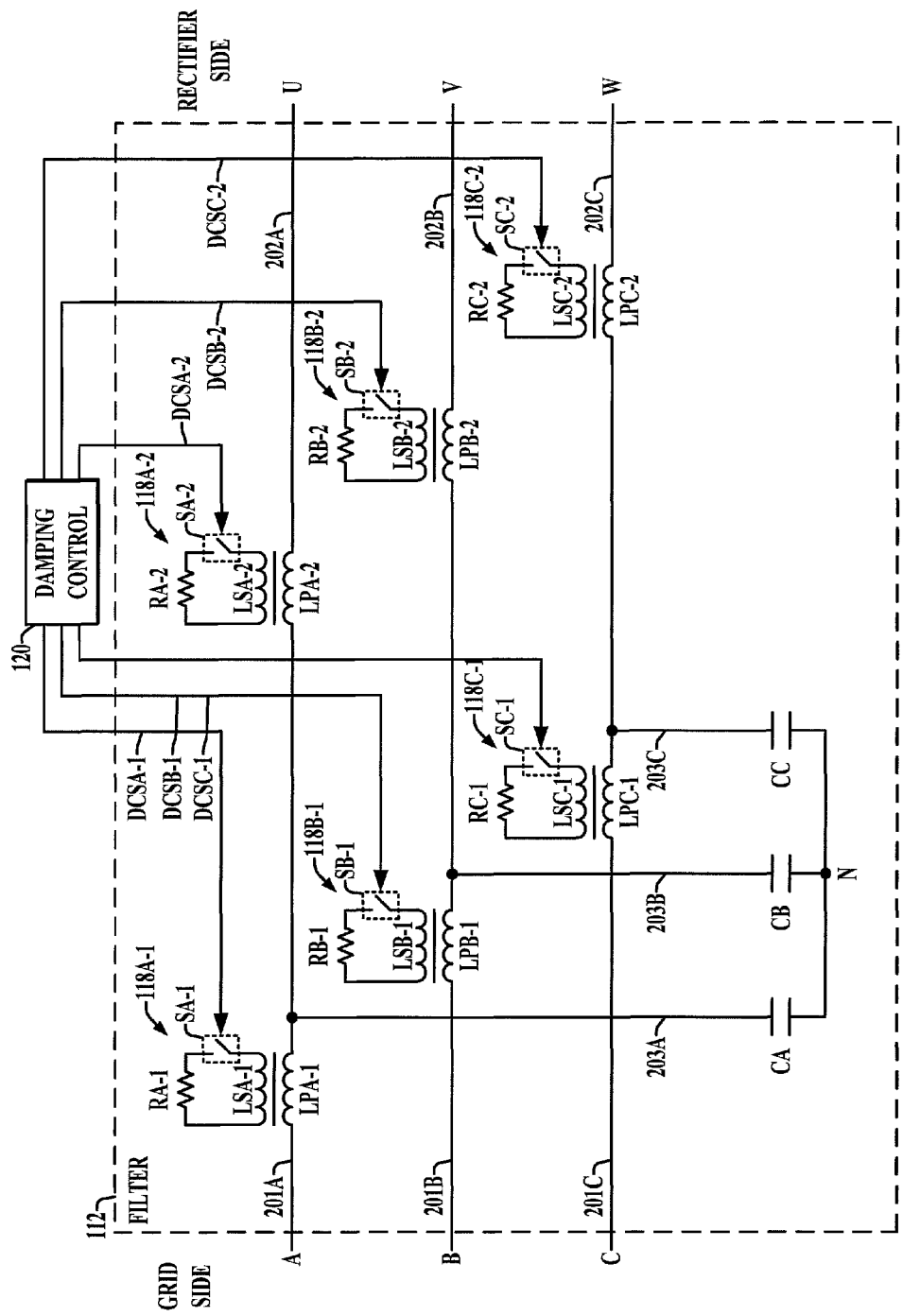
Figure 12:
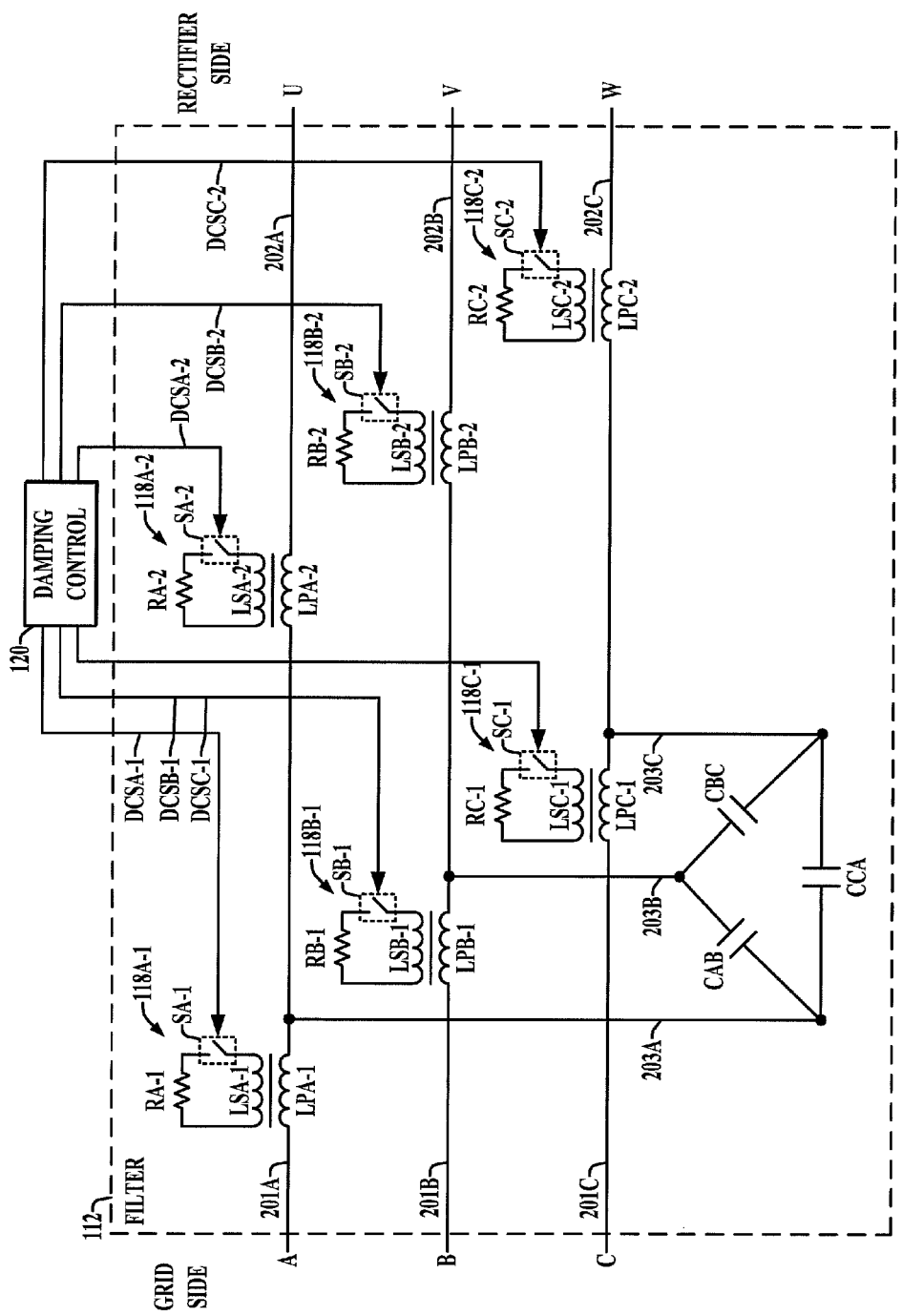

FIG. 1 is a schematic diagram.
FIG. 2 is a schematic diagram.
FIG. 3 is a schematic diagram.
FIG. 4 is a flow chart.
FIG. 5 is a schematic diagram.
FIG. 6 is a schematic diagram.
FIG. 7 is a schematic diagram.
FIG. 8 is a schematic diagram.
FIG. 9 is a schematic diagram.
FIG. 10 is a schematic diagram.
FIG. 11 is a schematic diagram.
FIG. 12 is a schematic diagram.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale. Referring initially to FIGS. 1-3, FIG. 1 shows a power system 100 including a three-phase AC power source 102 providing AC input power along phase lines A, B and C to a motor drive power conversion system 110 to drive a motor load 104. The power conversion system 110 includes a three-phase input filter circuit 112 that delivers AC power along lines U, V and W to the input of a three-phase active front end (AFE) rectifier 114. The filter circuit 112 includes active damping circuitry 118, and the drive 110 includes a damping control circuit or controller 120. The rectifier 114 has an input to receive AC input power along the lines U, V and W, as well as an output to provide a DC output signal. An intermediate DC circuit, or DC bus is connected to the DC output of the rectifier 114, and in one example includes a capacitor CDC connected between positive and negative DC bus lines. FIG. 3 shows a current source converter implementation of the motor drive 110, including one or more DC link chokes or inductors LDC in the intermediate circuit between the output of the rectifier 114 and the input of an inverter 116. The inverter 116 in FIGS. 1 and 3 includes an input coupled to the output of the rectifier 114 through the intermediate circuit, and an output coupleable to the motor load 104 to provide an AC output signal. In this example, the inverter 116 provides a three-phase output signal to drive the motor load 104. In other examples, a single phase AC output signal can be provided by the output of the inverter to drive a load.

The power conversion system 110 can use a variety of different input filter topologies or configurations 112. For example, an inductor-capacitor (LC) or inductor-capacitor-inductor (LCL) input filter circuitry can be associated with each AC input phase to control the harmonic content of a connected power grid. For example, LCL or LC filters may be used in voltage source converters, such as the motor drive 110 of FIG. 1, and LC filters are often used with current source converters as shown in FIG. 3. Such filter circuits are subject to damage or degradation of the filter capacitors, such as by voltage surges or other transients. Filter capacitor degradation, in turn, may be costly in terms of replacement component costs, labor for inspection and replacement, as well as downtime for the power conversion system and any associated machinery. Moreover, filter capacitors may be degraded by oscillation or resonance and/or transient voltages seen by the filter circuit 112. In addition, such oscillation and/or resonance conditions in the motor drive 110 can lead to damage or degradation of one or more components of the AFE rectifier circuit 114 and/or a DC bus capacitor CDC (FIG. 1). In order to mitigate the possibility of component degradation due to oscillation and/or transients, the present disclosure provides damping circuitry 118 and damping controllers 120 to selectively damp the filter circuit 112 either proactively (e.g., at system startup) and/or in response to one or more detected conditions in the power conversion system 110 as detailed further below.

FIG. 2 shows a single phase portion of the filter circuit 112. The filter circuit 112 in one example is an LC filter with a filter inductor LP and a capacitor C. Similar LC filters are provided for each of the filter input and output connections A/U, B/V, C/W in the system 110 of FIG. 1. The filter inductor LP is connected between a filter input line 201 and a rectifier side filter output line 202, and conducts a first current I1 between the AC input (labeled as GRID SIDE in FIG. 2) and the rectifier 114 (RECTIFIER SIDE in FIG. 2). The active damping circuit 118 in FIG. 2 includes a secondary winding LS wound on a common core 204 with the filter inductor LP the, where LP and LS form a transformer with the filter inductor LP forming a primary winding. The secondary winding LS is magnetically coupled with the filter inductor LP to conduct a second current I2 induced by flow of the first current I1 through the filter inductor LP. The secondary winding is connected in a series circuit with a damping resistor R and a switch S. Any suitable switch can be used, such as a thyristor or other semiconductor-based switch operable according to a damping control signal DCS from the damping control circuit 120. In the illustrated example, the switch S is closed when the DCS signal is in a first state to allow flow of the second current I2 through the damping resistor R. When the damping control signal DCS is in a different second state, the switch S is opened to prevent the second current I2 from flowing through the damping resistor R. The damping controller 120 provides the DCS signal to the switch S to control damping of the filter 112.

Unlike other approaches for damping control in which one or more damping resistors are selectively switched into the current carrying paths between the AC source 102 and the rectifier 114, the disclosed examples can use low voltage components including the resistor R and the switch S to effectively combat transients and unwanted resonant conditions in the motor drive 110. As a result, the damping circuitry 118 can be constructed using low voltage components which are cost-effective and do not occupy large amounts of volume within an enclosure of the motor drive system 110.

In operation, closure of the switch S allows the second current I2 to flow in the damping resistor R, thus presenting increased impedance to the grid side of the filter circuit 112. This added impedance can be advantageously employed to control or mitigate (e.g., damp) oscillations or transient events in the motor drive power conversion system 110. For example, transient conditions in the AC input power can occur when the conversion system 110 is started up, such as by closing an input contactor or breaker (not shown) to apply AC input power to the drive 110. In other examples, transients or oscillations can occur on the grid side based on load changes elsewhere in the grid, such as a different motor drive turning on or off. In this regard, the filter circuit 112 may implement a low pass filter function with a cutoff frequency set above the fundamental frequency of the AC input source 102, and the filter circuit 112 may undergo resonance at one or more harmonics of the AC input frequency (e.g., fifth harmonic resonance). Such resonance and/or extreme transient voltage conditions associated with the input filter circuit 112 can degrade components of the filter circuit 112 including the filter capacitor C, the active front end rectifier 114 and/or the DC capacitor CDC in certain conditions. Selective application of damping by the controller 120 can be used to mitigate or eliminate such harmonic resonance by engaging the active damping circuit 118.

The controller 120 in certain examples provides the damping control signal DCS to the switch S of the individual active damping circuits 118 to turn on the associated switch S and thereby implement active damping in a continuous fashion. In other examples, the controller 120 provides the DCS signal as an alternating pulse width modulated signal with controlled on-time in order to control damping of the filter circuit 112. The controller 120 can initiate such continuous on-time or pulse width modulation damping control (e.g., duty cycle control) according to any suitable open loop or closed loop control configuration. For example, the controller 120 in one example controls or regulates the on-time of the damping circuit switch S according to a detected oscillation or transient condition in the power conversion system 110. In one example, the controller 120 receives sensor information from one or more system sensors (not shown) indicating transients in the DC link or intermediate circuit, such as transient voltage rises on the DC link capacitor CDC, and in response, selectively controls an on-time of the switch S by providing a pulse width modulated DCS signal. The on-time of the signal DCS is regulated in one example according to a magnitude of a detected voltage rise on the DC link capacitor CDC. In another possible example, the controller 120 responsively provides a pulse width modulated or continuous on-time damping control signal DCS to turn on the damping switch S based on detected resonance in the system 110. This can be done, for instance, according to detected fifth or other harmonics in the DC bus voltage across the capacitor CDC, with the on-time regulated according to the magnitude of the detected harmonic or harmonics. In certain implementations, the controller 120 further monitors one or more system conditions and discontinues active damping operation once a detected transient or resonance condition has been remedied. In this fashion, the controller 120 and the damping circuitry 118 provide active damping on demand capabilities to selectively employ damping when needed. Also, as further described below in connection with FIG. 4, the controller 120 may provide automatic damping activation at system turn on in certain embodiments.

In certain examples, the controller 120 advantageously activates the damping circuit 118 by turning on the associated switch S continuously or with a pulse width modulation controlled on-time at startup of the power conversion system 120. In this manner, damping is employed to mitigate the onset of resonance as the filter circuit 112 is initially energized. This damping, moreover, can also mitigate the likelihood that other circuits and systems connected to the power source 102 (e.g., supply grid) will be subjected to transients or resonance conditions when the power conversion system 110 is started.

Referring now to FIG. 4, a method or process 400 is illustrated for automatically controlling damping of a filter circuit 112 of the power conversion system 110. The illustrated method 400 can be implemented, for example, by the damping control circuit 120 in the motor drive 110 of FIG. 1 or FIG. 3. The drive is turned on at 402 in FIG. 4, for example, using a contactor or circuit breaker (not shown) between the AC input source 102 and the input filter circuit 112. At 404, the controller 120 activates the damping circuit 118, either fully on or using duty cycle control via a pulse width modulated control signal DCS to control an on-time during which the damping circuit switch S is turned on. The controller 120 can activate the active damping circuit 118 prior to, contemporaneous with, or sometime after, startup of the motor drive 110. Each of these conditions is considered to be "at startup" of the power conversion system 110 is used herein. This operation with the damping circuit activated at 404 may continue in one example for a predetermined time sufficient to ensure that the filter circuit 112 and the host motor drive system 110 will not undergo resonance or unwanted transient conditions based on energization of the filter circuit 112.

At 406 in the example of FIG. 4, the controller 120 deactivates the damping circuits 118, for example, by placing the associated DCS signals in the second state to turn off the associated damping circuit switches S. The power conversion system 110 undergoes various startup procedures (e.g., precharging of the DC link capacitor CDC in the example of FIG. 1), and assumes normal drive operation at 408. At 410, the controller 120 determines whether a transient or oscillation condition has been detected in the system 110. If not (NO at 410), the normal drive operation continues. Once a transient or oscillation condition has been detected in the system 110 (YES at 410), the controller 120 activates the damping circuitry 118 using full on or duty cycle control at 412. In this manner, the controller 120 provides active damping on demand in a responsive manner to accommodate changing conditions in the motor drive 110 and/or the grid side AC power source 102. The controller 120 makes a further determination at 414 as to whether the transient or oscillation condition remains. If so (YES at 414), operation continues with the damping circuits 118 activated. Otherwise, if the transient or oscillation condition has subsided (NO at 414), the process 400 returns to deactivate the damping circuits 118 at 406 and normal drive operation is resumed at 408.

Referring now to FIGS. 5-12, various example three-phase filter circuits and associated active damping circuits 118 are illustrated. These examples are non-limiting, and other single or multiphase examples can be used in a given system, in which a filter inductor and an associated secondary winding provide a transformer with a switch selectable damping resistance in a secondary circuit.

FIG. 5 shows an example LC filter circuit 112 in which the filter capacitors CA, CB and CC are connected in a "Y" configuration with a filter neutral N. In this example, a first filter inductor LPA is connected between a first input phase line 201A (A) and a first rectifier input line 202A (U), and the filter capacitor CA is connected between the line 202A and the neutral N. An active damping circuit 118A is associated with the filter inductor LPA, including a secondary winding LSA wound on a common core with a winding of the inductor LPA, as well as a first damping resistor RA and a switch SA operated according to a damping control signal DCSA from the damping control circuit 120. The filter circuit 112 in this example further includes a second filter inductor LPAB connected between lines 201B (B) and 202B (V), with the filter capacitor CB connected between the line 202B and the neutral N. A second active damping circuit 118B is provided, including a secondary winding LSB magnetically coupled with the second filter inductor LPB via winding around a common core, and the secondary winding LSB is in a series circuit with a second damping resistor RB and a second switch SB operated according to a control signal DCSB. The filter circuit 112 also includes a third inductor LPC connected between the grid side line 201C (C) and the rectifier side line 202C (W), with the filter capacitor CC connected between the line 202C and the neutral N. A third active damping circuit 118C includes a secondary winding LSC magnetically coupled with the inductor LPC, and the secondary winding LSC is in a series circuit with a third damping resistor RC and a third switch SC operated according to a control signal DCSC from the controller 120.

FIG. 6 shows another example three-phase LC implementation of the filter circuit 112 and the damping control circuitry 118, similar in most respects to the example of FIG. 5. In the filter circuit 112 of FIG. 6, however, three filter capacitors CAB, CBC, and CCA are interconnected in a Delta configuration. The controller 120 operates as described above in connection with FIGS. 1-4 in order to provide continuous on-time and/or pulse width modulated control of the individual damping circuits 118 in the systems 110 of FIGS. 5 and 6 via signals DCS in a proactive manner (e.g., on system startup) and/or in response to one or more detected conditions, such as detected transient and/or oscillation conditions in the system 110. The controller 120 may, but need not, synchronize the respective damping control signals DCSA, DCSB and DCSC with one another.

FIGS. 7 and 8 respectively show Y and Delta-connected LCL filter circuits 112 and associated damping circuitry 118 which can be used in the systems 110 of FIGS. 1 and/or 3 above. In these examples, the first phase line of the filter circuit 112 (e.g., from A to U) includes a first filter inductor LPA-1 with an associated low-voltage damping circuit 118A, and a second filter inductor LA-2 connected between an intermediate node 203A and the rectifier side line 202A. Similarly, the B/V and C/W phases include first filter inductors LPB-1 and LPC-1 as well as second filter inductors LB-2 and LC-2 connected between the intermediate nodes 203B, 203C and the rectifier side lines 202B and 202C as shown in FIG. 7. The B/V and C/W phases also include damping circuits 118B and 118C providing secondary circuits to the first filter inductors LPB-1 and LPC-1, respectively. In FIG. 7, the filter capacitor CA is connected between the line 203A and the neutral N, capacitor CB is connected between the line 203B and the neutral N, and the capacitor CC is connected between the line 203C and the neutral N. FIG. 8 illustrates a Delta filter circuit example 112, in which the filter capacitors CAB, CBC, and CCA are interconnected in a Delta configuration.

FIGS. 9 and 10 respectively show Y and Delta-connected LCL filter circuits 112 along with associated damping circuitry 118A, 118B and 118C. Unlike the LCL filters 112 in FIGS. 7 and 8, the damping circuitry 118 in FIGS. 9 and 10 are individually associated with the second filter inductors on the rectifier side of the filter circuit 112. For example, the A/U phase of the filter 112 includes a first filter inductor LA-1 and a second filter inductor LPA-2 connected between the intermediate node 203A and the rectifier side output line 202A, with an associated secondary circuit providing a damping circuit 118A. The B/V and C/W phases include first filter inductors LPB-1 and LPC-1 as well as second filter inductors LB-2 and LC-2 connected between the intermediate nodes 203B, 203C and the rectifier side lines 202B and 202C as shown in FIG. 7. In the filter 112 of FIG. 9, the filter capacitors CA, CB and CC are connected in a Y configuration with a neutral connection N, whereas the filter capacitors CAB, CBC and CCA are connected in a Delta configuration in the filter 112 of FIG. 10.

FIGS. 11 and 12 illustrate further example LCL filters 112, each including first filter inductors LPA-1, LPB-1 and LPC-1 as well as second filter inductors LPA-2, LPB-2 and LPC-2. In these examples, damping circuits 118 are individually associated with each of the first and second filter inductors. For example, the first phase includes a first damping circuit 118A-1 including a secondary winding LSA-1, a damping resistor RA-1 and a switch SA-1 operated according to a control signal DCSA-1, as well as a second damping circuit 118A-2 including a secondary winding LSA-2, a damping resistor RA-2 and a switch SA-2 operated according to a damping control signal DCSA-2. Similarly, the second phase (BN) includes a first damping circuit 118B-1 with a secondary winding LSB-1, a damping resistor RB-1 and a switch SB-1 operated according to a control signal DCSB-1, and a second damping circuit 118B-2 including a secondary winding LSB-2, a damping resistor RB-2 and a switch SB-2 operated according to a damping control signal DCSB-2. The third phase (C/W) includes a first damping circuit 118C-1 with a secondary winding LSC-1 magnetically coupled with the inductor LPC-1, a damping resistor RC-1 and a switch SC-1 operated according to a control signal DCSC-1, and a second damping circuit 118C-2 including a secondary winding LSC-2 magnetically coupled with the filter inductor LPC-2, a damping resistor RC-2 and a switch SC-2 operated according to a damping control signal DCSC-2. The filter 112 of FIG. 11 includes filter capacitors CA, CB and CC connected in a Y configuration with a neutral connection N. In the filter 112 of FIG. 12, the filter capacitors CAB, CBC and CCA are connected in a Delta configuration.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:
1. A power conversion system, comprising:
  an AC input coupleable to receive AC input power from a power source;
  a rectifier, including an input to receive a filtered AC input power, and an output to provide a DC output signal;

an inverter, including an input coupled with the output of the rectifier, and an output coupleable to a load to provide an AC output signal;
a filter circuit coupled between the AC input and the rectifier, the filter circuit including:
  a first filter inductor to conduct a first current flowing between the AC input and the rectifier, and
  a filter capacitor coupled with the first filter inductor;
a damping circuit, including:
  a secondary winding magnetically coupled with the first filter inductor to conduct a second current induced by the first current flowing in the first filter inductor,
  a damping resistor,
  a first switch coupled in a series circuit with the secondary winding and the damping resistor, the first switch operative when a damping control signal is in a first state to allow the second current to flow through the damping resistor, and the first switch operative when the damping control signal is in a second state to prevent the second current from flowing through the damping resistor,
  a further secondary winding magnetically coupled with a second filter inductor to conduct a third current induced by current flowing in the second filter inductor,
  a second damping resistor, and
  a second switch coupled in a series circuit with the further secondary winding and the second damping resistor, the second switch operative when a second damping control signal is in a first state to allow the third current to flow through the second damping resistor, and the second switch operative when the second damping control signal is in a second state to prevent the third current from flowing through the second damping resistor; and
a controller to provide the damping control signal to the first switch and to provide the second damping control signal to the second switch to control damping of the filter circuit.

2. The power conversion system of claim 1, wherein the controller is operative to provide the damping control signal to the first switch as an alternating pulse width modulated signal to control damping of the filter circuit.

3. The power conversion system of claim 2, wherein the controller is operative to selectively control an on-time of the first switch when the alternating pulse width modulated damping control signal is in the first state responsive to a detected oscillation or transient in the power conversion system.

4. The power conversion system of claim 3, wherein the controller is operative to selectively control an on-time of the first switch when the alternating pulse width modulated damping control signal is in the first state at startup of the power conversion system.

5. The power conversion system of claim 2, wherein the filter circuit is an LC filter, and wherein the first filter inductor is coupled between the AC input and the rectifier.

6. The power conversion system of claim 2, wherein the filter circuit is an LCL filter including the second filter inductor coupled in series with the first filter inductor between the AC input and the rectifier.

7. The power conversion system of claim 2, wherein the controller is operative to selectively control an on-time of the first switch when the alternating pulse width modulated damping control signal is in the first state at startup of the power conversion system.

8. The power conversion system of claim 1, wherein the controller is operative to provide the damping control signal in the first state at startup of the power conversion system.

9. The power conversion system of claim 1, wherein the filter circuit is an LCL filter including the second filter inductor coupled in series with the first filter inductor between the AC input and the rectifier.

10. The power conversion system of claim 1, wherein the secondary winding and the first filter inductor are wound on a common core.

11. A method to automatically control damping of a filter circuit of a power conversion system, the method comprising:
  providing a first damping resistor and a first switch in a series circuit with a secondary winding magnetically coupled with a first filter inductor of the filter circuit of the power conversion system to conduct a second current induced by a first current flowing in the first filter inductor;
  providing a second damping resistor and a second switch in a series circuit with a further secondary winding magnetically coupled with a second filter inductor of the filter circuit to conduct a fourth current induced by a third current flowing in the second filter inductor; and
  selectively turning the first switch on to allow the second current to flow in the first damping resistor and turning the second switch on to allow the fourth current to flow in the second damping resistor to control damping of the filter circuit.

12. The method of claim 11, further comprising controlling an on-time of the first switch to control damping of the filter circuit.

13. The method of claim 11, further comprising selectively turning the first switch on responsive to a detected oscillation or transient in the power conversion system.

14. The method of claim 13, further comprising controlling an on-time of the first switch to control damping of the filter circuit responsive to the detected oscillation or transient in the power conversion system.

15. The method of claim 11, further comprising turning the first switch on at startup of the power conversion system.

16. The method of claim 15, further comprising controlling an on-time of the first switch to control damping of the filter circuit at startup of the power conversion system.

17. A damping circuit to control damping of a filter circuit in a power conversion system, comprising:
  a transformer, including:
    a primary winding wound around a core conduct a first current flowing in the filter circuit between an AC input and a rectifier of a power conversion system,
    a secondary winding wound around the core to conduct a second current induced by current flowing in the primary winding,
    a damping resistor,
    a first switch coupled in a series circuit with the secondary winding and the damping resistor,
    a further secondary winding magnetically coupled with a second primary winding in the filter circuit to conduct a third current induced by current flowing in the filter circuit,
    a second damping resistor, and
    a second switch coupled in a series circuit with the further secondary winding and the second damping resistor; and
  a controller to selectively close the first switch and to selectively close the second switch to control damping of the filter circuit.

18. The damping circuit of claim 17, wherein the controller is operative to control an on-time of the first switch to control damping of the filter circuit.

19. The damping circuit of claim 17, wherein the controller is operative to selectively close the first switch responsive to a detected oscillation or transient in the power conversion system.

* * * * *